(12) United States Patent
Martin et al.

(10) Patent No.: US 8,131,885 B2
(45) Date of Patent: Mar. 6, 2012

(54) METHOD AND SYSTEM OF CONTROLLING COMPUTER SYSTEM EXTERNAL EFFECTS FOR A COMPUTER GAME, THE EXTERNAL EFFECTS SUCH AS INCANDESCENT LIGHTS, FLUORESCENT LIGHTS, VIBRATION DEVICES, LED/LASER DIODES, AND/OR FANS

(75) Inventors: Robert P. Martin, Fort Collins, CO (US); Andrew L. Wiltzius, Fort Collins, CO (US); Bruce E. Blaho, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1195 days.

(21) Appl. No.: 11/265,341

(22) Filed: Nov. 2, 2005

(65) Prior Publication Data

US 2007/0168570 A1 Jul. 19, 2007

(51) Int. Cl.
*G06F 3/00* (2006.01)
*G06F 17/00* (2006.01)

(52) U.S. Cl. .............................................. 710/8; 463/16
(58) Field of Classification Search ................ 710/8, 10, 710/12, 15, 62, 63, 64, 72, 73, 74; 463/16
See application file for complete search history.

(56) References Cited

U.S. PATENT DOCUMENTS

| | | | | |
|---|---|---|---|---|
| 6,004,134 A | * | 12/1999 | Marcus et al. | 434/45 |
| 6,656,041 B1 | * | 12/2003 | Kaminkow et al. | 463/16 |
| 6,941,114 B1 | * | 9/2005 | Kuo et al. | 455/74 |

OTHER PUBLICATIONS

Analog Output Series Help (on-line help document for NI-DAQ 7.3 driver-software), Dec. 2004, National Instrument, (pp. 1, 6, 29, 34, 39, 50, 72, and 81).*
SSR Series Modules and Backplanes (User Guide), Sep. 1998, National Instrument, (p. 1 and 9).*
Gregory Cala, Ph.D., LabVIEW Creats a High-Throughput Liquid Handling System, Oct. 2002, Data Science Automation, Inc., (pp. 1 and 2).*
Dave Rye, Dave Rye with X10 for 30 Years!, chronology of events available within the document, http://www.hometoys.com/news.php4?section=view&id-15812638.*
Andrew Burgess, 'USB temp sensors for PC monitoring', Sep. 10, 2004, Forum on http://groups.google.com/group/comp.home.automation/browse_thread/thread/68c95a659a651643/6baee620dd5eb233?Ink=st&q=fan+x10&rnum=317.*
Yasuhisa Kato, 'Introduction: What is force feedback devices?', Jan. 19, 2002, http://ldt.standford.edu/~yasukato/portfolio/class/cs147/as8 dated by http://web.archive.org/web/200220119172341.*
Julian Strate, 'Logitech Wingman Force Feedback Mouse', Dec. 10, 1999, http://www.amazon.com/Logitech-WingMan-Force-Feedback-Mouse/dp/B00001W01Z.*
Screen Shot of Heavy Gear II PC Game—Modify Item Menu captured from www.gamespot.com, Dec. 10, 1999, dated by Julian Strate's article above.*

(Continued)

*Primary Examiner* — Hyun Nam

(57) ABSTRACT

A method and system of controlling computer system external effects. At least some of the illustrative embodiments may be a computer system comprising a processor (wherein a computer system user interacting with software executed on the processor triggers a software event), and an external effects controller coupled to the processor (wherein the external effects controller controls at least one device being a purely aesthetic device or a non-aesthetic device operated in a manner for aesthetic reasons). The computer system user selectively associates the at least one device to the software event such that, if associated, upon occurrence of the software event an operational state of the at least one device is changed by the external effects controller.

5 Claims, 2 Drawing Sheets

OTHER PUBLICATIONS

Sceen Shot of Heavy Gear II PC Game—Modify Item Menu captured from www.gamespot.com, Dec. 10, 1999, dated by Julian Strate's article above.*

Screen Shot of HP OfficeJet V45 Control Panel on Windows XP Operating System, copy right date of the driver software is 1995-1999, Hewlett Packard.*

Kamal Poddar and Sanjay Gupta, Instrumentation for National Wind Tunnel Facility at IIT Kanpur, circa Jan. 1999, Indian Institute of Technology.*

David Thomson, A Novel Embedded System for a Combat Robot, Circa 2003, Original Code Consulting, (Date of publication shown in www.originalcode.com and www.botlabs.com).*

Definition of 'aesthetic' from www.webster.com, 1798, Merriam-Webster.*

Tal Blevins, Heavy Gear II: The next contender in the giant robot sim arena packs a migthy punch, but it's no TKO, Jun. 29, 1999.*

Definition of 'Games' from www.xreferplus.com, 2004, Berkshire Publishing Group LLC.*

ViBots, 2003, www.vibots.com.*

Peter Gredelj, Logitech WingMan Force Feedback Mouse, www.benchmark.co.yu.*

*Microsoft® Computer Dictionary*, p. 119 (5th ed. 2002).*

* cited by examiner

METHOD AND SYSTEM OF CONTROLLING COMPUTER SYSTEM EXTERNAL EFFECTS FOR A COMPUTER GAME, THE EXTERNAL EFFECTS SUCH AS INCANDESCENT LIGHTS, FLUORESCENT LIGHTS, VIBRATION DEVICES, LED/LASER DIODES, AND/OR FANS

BACKGROUND

A particular segment of the population executes and interacts with software-based games on personal computers, rather than dedicated game consoles. This segment of the population may be referred to "PC Gamers." Part of the allure of being a PC Gamer is the ability to build personalized computer systems from individual components, and then execute the software-based games on the personalized computer systems. For example, specialty computer cases or boxes in a variety of colors and with see-through panels are available. Some PC Gamers also employ purely aesthetic add-on devices such as black lights, neon bulbs, light emitting diodes, and laser diodes. Operation of these purely aesthetic devices are manually controlled, or varied based on ambient sound, but are not otherwise linked to game play. For performance enhancement, some PC Gamers modify their motherboards to clock the processor beyond the processor's rated clock rate, and these computer systems thus require additional cooling, such as fans and water-based cooling systems.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
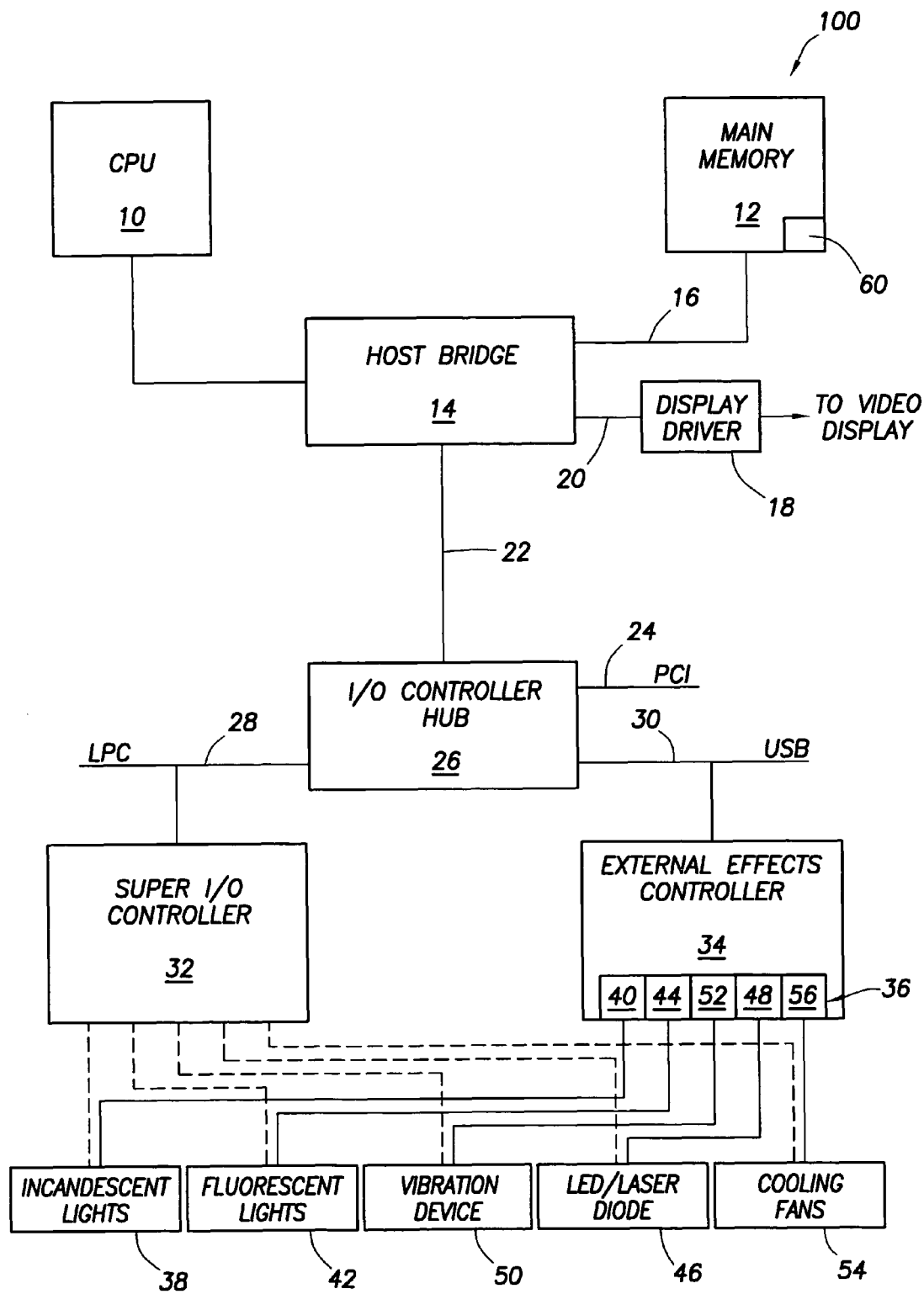
FIG. 1 shows a computer system in accordance with the embodiments of the invention.

FIG. 1 illustrates a computer system 100 in accordance with at least some embodiments of the invention. In particular, computer system 100 comprises at least one CPU or processor 10. In alternative embodiments the computer system 100 comprises multiple processors arranged in a configuration where parallel computing may take place. The processor 10 couples to a main memory array 12 and a variety of other peripheral computer system components through a host bridge logic 14. The main memory array 12 couples to the host bridge logic 14 through a memory bus 16. The host bridge logic 14 controls transactions to the main memory 12 by asserting the control signals during memory accesses. The main memory 12 functions as the working memory for the processor 10 and comprises a memory device or array of memory devices in which program instructions and data are stored. The main memory array 12 may comprise any suitable type of memory such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

Text and video generated by software executing on the processor is provided to a display driver device 18 coupled to the host bridge 14 by way of an Advanced Graphics Port bus 20, PCI-Express, or other suitable type of bus. Alternatively, the display driver device could couple to the primary expansion bus 22 or one of the secondary expansion buses, (i.e., the peripheral component interconnect (PCI) bus 24). The display device to which the display driver device 18 may couple comprises any suitable electronic display device upon which any image or text can be represented.

Computer system 100 also comprises a second bridge logic device 26 that bridges the primary expansion bus 22 to various secondary buses such as a low pin count (LPC) bus 28, the PCI bus 24, and a Universal Serial Bus (USB) 30. These secondary expansion buses are only illustrative, and other secondary expansion buses and bus protocols now in existence, or after-developed, could be equivalently used. In some embodiments, the bridge device 26 is an Input/Output (I/O) Controller Hub (ICH) such as that manufactured by Intel Corporation. In the embodiments shown in FIG. 1 using an I/O Controller Hub as the second bridge logic device, the primary expansion bus 22 is a Hub-link bus, which is a proprietary bus of the Intel Corporation. However, computer system 100 is not limited to any particular chipset vendor, and thus other suitable buses as well as chipsets from other manufacturers may be equivalently used.

A Super Input/Output (I/O) controller 32 couples to the second bridge logic device 26 and controls many system functions. The Super I/O controller 32 may interface, for example, with a system pointing device such as a mouse, various serial ports and floppy drives. The Super I/O controller is often referred to as "super" because of the many I/O functions it may perform.

A computer system 100 in accordance with some embodiments also comprises an external effects controller 34 coupled to the processor 10. In the embodiments shown in FIG. 1, the external effects controller 34 couples to the processor 10 by way of the USB 30; however, in alternative embodiments the external effects controller 34 couples to the processor 10 by way of PCI bus 24, primary expansion bus 22, or any other bus or bus protocol now in existence or after-developed. In other alternative embodiments, the external effects controller 34 could be combined with other functionality (e.g., the graphics card). In yet still other embodiments, multiple external effects controllers 34 could be present in the system.

As the name implies, the external effects controller 34 controls a variety of devices that may or may not relate to proper execution of software by computer system 100. In particular, external effects controller 34 comprises a plurality of output signal ports 36 that couple to a plurality of devices, which devices may be purely aesthetic devices or non-aesthetic devices that the external effects controller controls for aesthetic reasons. For example, external effects controller 34 may couple to one or more incandescent lights 38 by way of an output port 40. In some embodiments, output port 40 is a switch or digital output port, meaning that the external effects controller has on-off control of the one or more incandescent lights. Brightness may be controlled in these embodiments by pulse-width modulation of the signal of the digital output port 40. In alternative embodiments, output port 40 may be an analog output port, and in these embodiments the external effects controller 34 may have not only on-off control, but may also control the brightness using variable output voltages.

External effects controller 34 may also couple one or more fluorescent lights 42 by way of an output port 44. The fluorescents lights 42 may be, for example, a Logisys cold cathode ultraviolet light model number CLK15BL available from Logisys Computer, Inc. of Pomona Calif. In some embodiments, output port 44 may be a digital output port, meaning that the external effects controller has on-off control of the one or more fluorescent lights. Brightness may be controlled in these embodiments by pulse-width modulation of the signal of the digital output port 44. In alternative embodiments, output port 44 may be an analog output port, and in these embodiments the external effects controller 34 may have not only on-off control, but may also control the brightness using variable output voltages.

External effects controller 34 may also couple to one or more light emitting diodes (LEDs) and/or laser diodes 46 by way of an output port 48. The LEDs and/or laser diodes 46 may be a laser beam LED part number LB-R available from Logisys Computer, Inc. In some embodiments, output port 48 may be a digital output port, meaning that the external effects controller has on-off control of the one or more LEDs and/or laser diodes. Brightness may be controlled in these embodiments by pulse-width modulation of the signal of the digital output port 48. In alternative embodiments, output port 44 may be an analog output port, and in these embodiments the external effects controller 34 may have not only on-off control, but may also control the brightness using variable output voltages.

External effects controller 34 may also couple to one or more vibration devices 50 by way of an output port 52. In these embodiments, the one or more vibration devices 50 are contemplated to be devices having an eccentric weight coupled to the shaft of an electric motor. In some embodiments, output port 48 may be a digital output port, meaning that the external effects controller has on-off control of the vibration device 50. Speed of the motor of the vibration device, and therefore the vibration frequency, may be controlled in these embodiments by pulse-width modulation of the signal of the digital output port 52. In alternative embodiments, output port 52 may be an analog output port, and in these embodiments the external effects controller 34 may have not only on-off control, but may also control the speed of the motor, whether by a variable voltage direct current (DC) voltage, or by generating an alternating current (AC) signal having selectable voltage and frequency.

The illustrative external effects discussed to this point have been purely aesthetic devices, i.e., proper execution of software on the processor 10 is not dependent upon the operational state of these devices. However, the external effects controller may also control non-aesthetic devices, possibly in a manner for aesthetic reasons, such as one or more cooling fans 54. In particular, the external effects controller may couple to the one or more cooling fans 54 by way of output port 56. The cooling fans may be, for example, a cooling fan with integrated LEDs having a part number LT9BLRD available from Logisys Computer, Inc. In some embodiments, output port 56 may be a digital output port, meaning that the external effects controller has on-off control of the one or more cooling fans 54. Speed of the motor coupled to the fan may be controlled in these embodiments by pulse-width modulation of the signal of the digital output port 52. In alternative embodiments, output port 56 may be an analog output port, and in these embodiments speed may be controlled, whether by a variable DC voltage, or by generating and AC signal having selectable voltage and frequency.

Yet still other external effects that could be controlled by the external effects controller 32, possibly using the output signal ports 36, related directly to the user. For example, the external effects controller 32 may trigger devices for olfactory stimulation. Further, the external effects controller 32 may directly or indirectly trigger direct muscle and/or neural stimulation of the user.

In accordance with embodiments of the invention, the external effects controller 34 selectively controls the various external effects based on the occurrence of software events. More particularly, in accordance with embodiments of the invention a computer system user has the capability of associating various software events (e.g., events that occur during execution of software-based game play) to operation of the various external effects such that upon the occurrence of a software event, an operational state of one or more of the external effects is changed. In the illustrative context of software-based game play, the software events which trigger changes in operational state may be based on game play parameters (e.g., character health, remaining lives, character heart rate, speed, altitude), or may be based on particular milestones in game play (e.g., game start, game win, a game loss, opponent kill, striking a blow to the opponent (directly or through a weapon), being struck by an opponent (directly or through a weapon), successful takeoff, successful landing).

The operational state changes are varied as well. The software event could trigger a change in the operational state from on to off, or from off to on. In cases where varying speed and/or brightness are possible, the software event could trigger a change in the speed, brightness or intensity of one or more external effects. In the illustrative case of a cooling fan operated for aesthetic reasons, the software event could trigger a fan speed increase (with associated noise), with the fan speed increase not needed for cooling effects of any internal components.

In accordance with embodiments of the invention, prior to game play a user associates software events to external effects, such as by entering that information in the computer system 100 by way of a software applet. In alternative embodiments, especially personal computers, the user may make or change associations during game play. The information entered by the user may be stored in many forms, but in at least some embodiments, and during operation, the information is stored in a table 60 (FIG. 1) in main memory 12. The information of the table 60 may be stored in non-volatile memory when the computer system 100 is not operational and loaded during the boot process. After associating the software events to external effects, the software-based game or other software may be executed, and wherein the software events are triggered based on interaction of the user with the software.

In accordance with embodiments of the invention, when a software event is reached, the software notes such an event by way of an application programming interface, and the software within which the event occurred can resume its operation. The application programming interface, thereafter, communicates with the external effects controller 34 to effectuate the change of operational state of at least one external device.

Communicating with the external effects controller 34 may take many forms. In some embodiments, the external effects controller may be fully controlled by the application programming interface software. In these embodiments, the application programming interface software, executing on processor 10, accesses the table 60 based on the particular software event, determines the one or more external effects whose operational state the user desires to change based on the particular event, and commands the external effects controller 34 to make such a change in one or more of its output ports 36.

In alternative embodiments, communicating with the external effects controller may involve the application programming interface software informing the external events controller 34 of the occurrence of the software event rather than commanding particular output signals. Thus, the interface software may send a packet-based message across the various computer system 100 buses, which messages inform the external effects controller of the software event. Alternatively, the interface software may place an indication of the software event in a portion of the main memory 12 accessible by the external effects controller 34. In these alternative embodiments, the external effects controller may periodically read the portion of the main memory 12 accessible to controller and software executing on the processor 10 to determine if a software event has occurred. Regardless of the mechanism by which the external effects controller 34 is notified, the external effects controller 34 makes changes to the states of the output ports 36 based on the associations held in table 60, a copy of which may also be stored in the external effects controller 34 itself.

Figure 2:
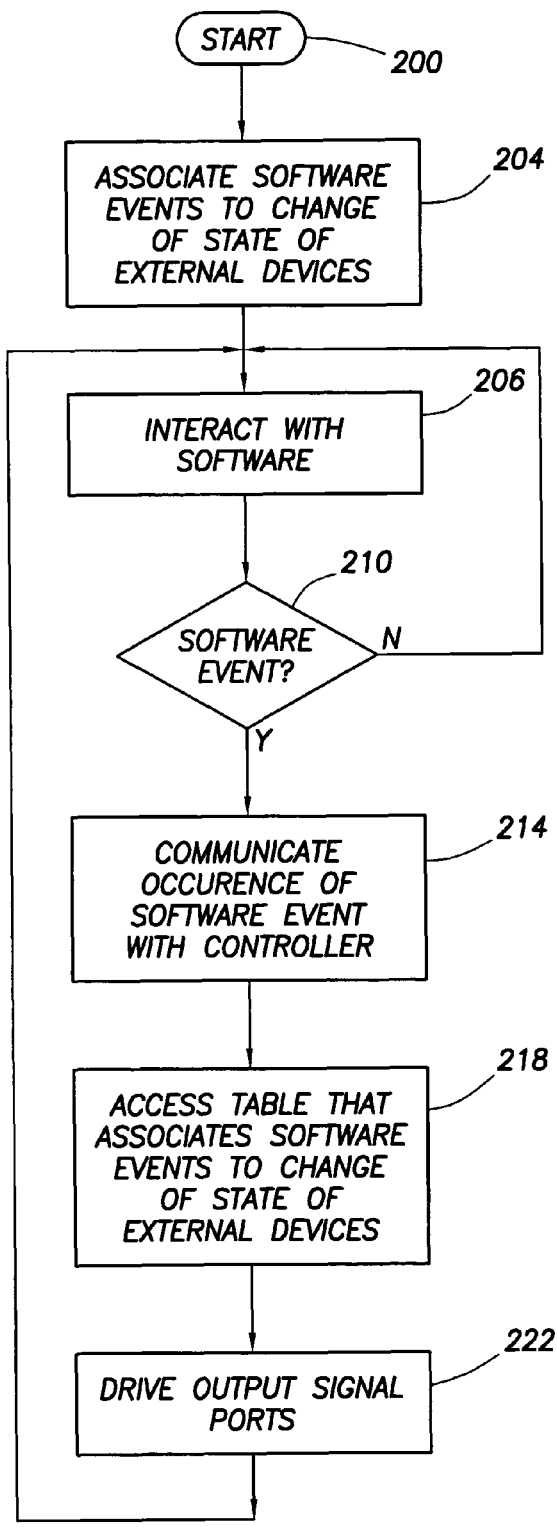
FIG. 2 shows a flow diagram of a method in accordance with the embodiments of the invention.

FIG. 2 illustrates a method in accordance with embodiments of the invention. The number and order of functions in FIG. 2 are merely illustrative. Some of these functions may be omitted, combined with others and performed in a different order without departing from the scope and spirit of the invention. The process starts (block 200), and thereafter the computer system user associates software events to changes of state of external devices (block 204). As discussed above, the external devices may be purely aesthetic devices (e.g., lights), or the external devices may non-aesthetic devices operated in a manner for aesthetic reasons (e.g., operating a fan above the speed needed for proper cooling). Thereafter, the user interacts with software (block 206) executing on the processor 10. The software could be, for example, a software-based game. Interacting with the software may trigger a software event, and thus the illustrative method checks for the occurrence of a software event (block 210). If no software event occurs, the illustrative process returns to the user interacting with the software (again block 206).

If a software event has occurred (again block 210), the occurrence of the software event is communicated to the external effects controller (block 214). As discussed above, the communication may be a message transferred across one or more of the expansion buses, or the external effects controller itself may periodically access memory looking for an indication that a particular software event has occurred. The table that associates software events to change of state of external devices is accessed (block 218) to determine the state of which external device should be changed. Based on the access to the table, one or more of the outputs of the external effects controller are driven (block 222), and the process resumes with the user interacting with software (block 206) and checking for the occurrence of software events (block 210).

In at least some embodiments of the invention, it is envisioned that the software itself, such as a software-based game, will be programmed to call the application programming interface upon occurrence of predetermined software events. In these embodiments software programmers, when coding the software or software-based game, will specifically code calls to the application program interface based on particular events. In alternative embodiments, the external effects controller 34 may operate in a system with software and/or software-based games not specifically programmed to make calls to the application programming interface at particular software events, and in these embodiments the memory and/or communication bus messages may be snooped to determine when particular events have taken place.

Referring again to FIG. 1, the Super I/O controller 32 discussed above may have additional and/or unused digital output ports and analog output ports. Thus, in accordance with alternative embodiments, the Super I/O 32 controller may control one or more of the external effects, as illustrated in FIG. 1 by the dashed lines between the Super I/O controller 32 and the illustrative external effects. Control of the external effects by the Super I/O controller may be in place of the external effects controller 34 (in which case the Super I/O controller become the external effects controller), or in conjunction with the external effects controller.

Figure 3:
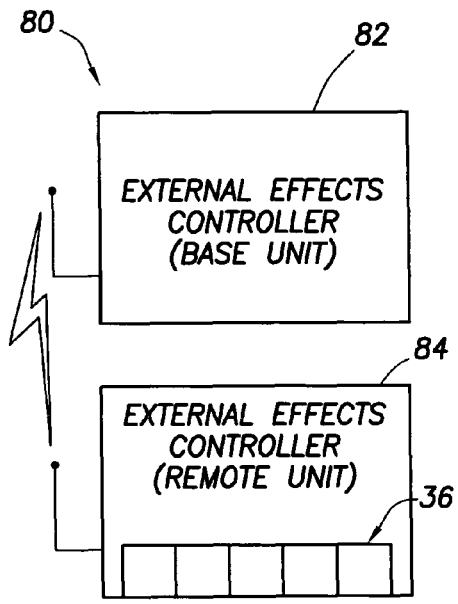
FIG. 3 shows alternative embodiments of an external effects controller in accordance with the embodiments of the invention.

FIG. 3 illustrates an external effects controller 80 in accordance with alternative embodiments of the invention. In particular, the external effects controller 80 of these alternative embodiments comprises a base unit 82 wirelessly coupled to a remote unit 84. The base unit 82 may couple to or within a computer system, such as computer system 100, by way of any suitable communication bus. The remote unit 84 may be located within the same computer system as the base unit 82, or at some distance from the computer system housing base unit 82. The remote unit 36 comprises output ports 36 similar to those of the external effects controller 34 (FIG. 1), and thus various external effects devices couple to the remote unit 84 by way of the output ports 36. The base unit 82 may use any suitable wireless communication system and/or protocol to couple to the remote unit 84 (e.g., Institute of Electrical and Electronic Engineers (IEEE) 802.11, or Bluetooth). In this way, the changes of state of the external effects based on the occurrence of software events need not be limited to the external effects coupled within or to the case of the computer system in which the software or software-based game is executing.

The various embodiments thus further comprise computer-readable media storing an application program interface program that, when executed by a processor, performs a method comprising accessing a data table where a computer system user has previously correlated desired actions and occurrence of game software events, communicating with an external effects controller, and driving output signals to external effects devices being purely aesthetic devices or non-aesthetic devices operated in a manner for aesthetic reasons based on desired actions from the data table and occurrence of the game software events.

What is claimed is:

1. A processor-based method comprising:
associating occurrence of a game event with the change of state of one or more of a plurality of external effects, the associating by a player of a game in which the game event occurs; and
interacting with the game to trigger the software event, the software event being one or more selected from the group consisting of: opponent kill event; game milestone change; character health change; remaining lives change; character heart rate change; and win/lose event; and
changing operational state of one or more of the plurality of external effects upon occurrence of the game event.

2. The processor-based method as defined in claim 1 wherein changing operational state further comprises one or more selected from the group consisting of: turning on a light; turning off a light; changing the brightness of a light; turning on a cooling fan; turning off a cooling fan; changing the speed of a cooling fan; turning on a vibration device; turning off a vibration device; and changing the vibration frequency of a vibration device.

3. The processor-based method as defined in claim 1 wherein associating further comprises executing an applet that enables a computer system user to selectively associate the occurrence of a software event with the change of state of one or more of the plurality of devices.

4. The processor-based method as defined in claim 3 wherein executing an applet further comprises populating a table that associates change of state of the plurality of devices to occurrence of the software event.

5. A computer system comprising:
a processor configured to execute gaming software, and the processor further configured to accept from a game player an association of game events to external effects;
an external effects controller coupled to the processor; and
an external effect coupled to the external effects controller;
wherein the external effects controller is configured to, upon occurrence of the game events, change an operational state of the external effect in conformance with the association of dame events to external effects,
wherein the external effects controller is configured to change operational state of the external effect based on a game event being one or more selected from the group consisting of: opponent kill event; game milestone; character health; remaining lives; character heart rate; and win/lose event.

* * * * *

UNITED STATES PATENT AND TRADEMARK OFFICE
CERTIFICATE OF CORRECTION

| | | |
|---|---|---|
| PATENT NO. | : 8,131,885 B2 | Page 1 of 1 |
| APPLICATION NO. | : 11/265341 | |
| DATED | : March 6, 2012 | |
| INVENTOR(S) | : Robert P. Martin et al. | |

It is certified that error appears in the above-identified patent and that said Letters Patent is hereby corrected as shown below:

In column 8, line 17, in Claim 5, delete "dame" and insert -- game --, therefor.

Signed and Sealed this
Sixth Day of November, 2012

David J. Kappos
*Director of the United States Patent and Trademark Office*